United States Patent
Derouet (10) Patent No.: US 7,966,712 B2
(45) Date of Patent: Jun. 28, 2011

(54) SYSTEM AND METHOD OF MOLDING AND ASSEMBLING A FLUID SPRAY DEVICE

(75) Inventor: Andre Derouet, Perdreauville (FR)

(73) Assignee: Valois SAS, Le Neubourg (FR)

( * ) Notice: Subject to any disclaimer, the term of this patent is extended or adjusted under 35 U.S.C. 154(b) by 0 days.

(21) Appl. No.: 12/482,571

(22) Filed: Jun. 11, 2009

(65) Prior Publication Data

US 2009/0295029 A1    Dec. 3, 2009

Related U.S. Application Data

(62) Division of application No. 10/519,004, filed as application No. PCT/FR03/01920 on Jun. 23, 2003, now Pat. No. 7,627,950.

(30) Foreign Application Priority Data

Jun. 24, 2002   (FR) ...................................... 02 07804

(51) Int. Cl.
*B21B 1/46*     (2006.01)
*B29C 65/02*    (2006.01)

(52) U.S. Cl. ...................... 29/527.1; 264/296

(58) Field of Classification Search ............... 29/527.1, 29/460, 428, 890.143, 890.142; 264/219, 264/296; 425/214, 317
See application file for complete search history.

(56) References Cited

U.S. PATENT DOCUMENTS 4,295,814 A    10/1981    Rosenberg

FOREIGN PATENT DOCUMENTS

| | | |
|---|---|---|
| EP | 1060868 A1 | 12/2000 |
| GB | 701452 A | 12/1953 |
| JP | 59-207303 A | 11/1984 |
| JP | 06-182806 A | 7/1994 |
| JP | 06-320564 A | 11/1994 |
| JP | 10-175230 | 6/1998 |
| JP | 10-511629 A | 11/1998 |
| JP | 11-019939 A | 1/1999 |
| WO | 9313927 A | 7/1993 |
| WO | 0236319 A1 | 5/2002 |

OTHER PUBLICATIONS

Patent Abstracts of Japan. vol. 1998, No. 11, Sep. 30, 1998.
Patent Abstracts of Japan, vol. 9, No. 77 (M-369), Apr. 6, 1985.

*Primary Examiner* — John C Hong
(74) *Attorney, Agent, or Firm* — Sughrue Mion, PLLC (57) ABSTRACT

A system for molding and assembling a fluid spray device, said system comprising two multi-cavity molds (B, C; B'; C') for molding two different parts (100, 200) of said fluid dispenser device, the system being characterized in that the first part (100) is a spray head and the second part (200) is an insert for assembling in said spray head (100), said system comprising means for assembling parts coming from each of the cavities of the first multi-cavity mold (B; B') in pairs always with parts coming from a corresponding respective cavity of said second multi-cavity mold (C; C'), such that the same insert (200) is always assembled in the same spray head, thereby guaranteeing constant spraying performance for each dispenser device assembled from the same pair of cavities.

4 Claims, 8 Drawing Sheets

SYSTEM AND METHOD OF MOLDING AND ASSEMBLING A FLUID SPRAY DEVICE

CROSS REFERENCE TO RELATED APPLICATIONS

This is a divisional of application Ser. No. 10/519,004 filed Dec. 27, 2004, which is a 371 of PCT/FR03/01920 filed Jun. 23, 2003, which claims foreign priority from FR 02/07804, filed on Jun. 24, 2002. The entire disclosure of the parent application, application Ser. No. 10/519,004, and the international application, PCT/FR03/01920, are hereby incorporated by reference.

The present invention relates to a system and to a method for molding and assembling a fluid spray device.

In the state of the art, two parts to be assembled together, e.g. an internal nozzle in the form of an insert or of a rod for mounting in the expulsion channel of a dispenser head, such as a nasal dispenser head, are initially molded in respective molds, and then transferred from the molds to an assembly unit. Industrially, the molds are generally multi-cavity molds enabling a large number of identical parts to be molded simultaneously in each mold. During subsequent assembly, the cavity from which each part comes is not determined, and assembly is performed randomly concerning the various cavities corresponding to the two parts that are assembled together. Even if each cavity in a multi-cavity mold enables a part to be made that satisfies predetermined requirements concerning a variety of properties for said part (dimensions, . . . ), there naturally exist small differences associated with manufacturing and molding tolerances. As a result, the assembled final devices present variations in performance, in particular concerning spraying, where said variations are not negligible and are impossible to predetermine.

Documents EP-1 060 868, WO 02/36319, and JP-10 175 230 disclose rotary molds enabling different hollow parts to be molded and heat-sealed to one another after rotation of a mold. Documents GB-701 452 and JP-59 207 303 disclose multi-cavity molds suitable for molding simultaneously in a plurality of cavities that are connected to one another by connections of material, and subsequently assembling parts from said cavities separately in an assembly step.

An object of the present invention is to provide a system and a method for molding and assembling a spray device that does not reproduce the drawbacks of the prior art as mentioned above.

An object of the present invention is thus to provide a system and a method for molding and assembling at least two different parts of a spray device coming from respective multi-cavity molds, in which it is possible to determine in constant manner the characteristics and the performance of the assembled devices, in particular concerning spraying.

Another object of the present invention is to provide a system and a method for molding and assembly that are simple and inexpensive.

The present invention thus provides a system for molding and assembling a fluid spray device, said system comprising two multi-cavity molds for molding two different parts of said fluid dispenser device, the system being characterized in that the first part is a spray head and the second part is an insert for assembling in said spray head, said system comprising means for assembling parts coming from each of the cavities of the first multi-cavity mold in pairs always with parts coming from a corresponding respective cavity of said second multi-cavity mold, such that the same insert is always assembled in the same spray head, thereby guaranteeing constant spraying performance for each dispenser device assembled from the same pair of cavities.

In a first advantageous embodiment of the present invention, the molding and assembly of said head and said insert are performed in a common molding and assembly unit, said molding and assembly unit comprising: a first mold portion and a second mold portion that are movable in translation towards each other in order to close and open the molding and assembly unit; each mold portion respectively including a core plate or a cavity plate respectively defining parts of a first multi-cavity mold and of a second multi-cavity mold; at least one of said first and second mold portions being rotatable in order to bring the parts molded in the first multi-cavity mold into register with the parts molded in the second multi-cavity mold, thereby forming an assembly zone, with closure of said molding and assembly unit causing said molded parts to be assembled together.

In a variant embodiment, the molding and assembly of said head and said insert are performed in a common molding and assembly unit, said molding and assembly unit comprising:
  a first mold portion and a second mold portion that are movable in translation towards each other to close and open the molding and assembly unit;
  the first mold portion defining part of a first multi-cavity mold, and including a core plate defining part of a second multi-cavity mold, said core plate being mounted to turn about the translation axis of the molding and assembly unit, and the second mold portion defining part of the second multi-cavity mold, and including a cavity plate defining part of a first multi-cavity mold, said cavity plate being mounted to rotate about the translation axis of the molding and assembly unit; and
  the core plate being offset perpendicularly from the translation axis of said molding and assembly unit relative to the cavity plate in such a manner that the two plates overlap each other in part so as to define an assembly zone, and are partially offset from each other so as to define the two respective multi-cavity molds.

Advantageously, each of the core and cavity plates has at least two mold cavities disposed in such a manner that when the molding and assembly unit is closed, at least one cavity is situated in the assembly zone and at least one cavity is situated in the corresponding multi-cavity molds.

Advantageously, in the assembly zone, each cavity of the core plate is always situated facing the same corresponding cavity of the cavity plate.

In a second embodiment of the invention, each part molded in said multi-cavity molds is identified after molding and is stored separately from the other parts prior to assembly.

Advantageously, each part of at least one of said multi-cavity molds include orientation-defining means, such that during assembly, the angular orientation of the head relative to the insert is always identical.

The present invention also provides a method of molding and assembling a fluid spray device comprising two different parts, the first part being a spray head and the second part being an insert for assembling in said head, the method being characterized in that it comprises the following steps:
  a) molding said head and said insert in respective multi-cavity molds; and
  b) assembling each part coming from a particular cavity of the first multi-cavity mold always with a part coming from the same respective cavity of the second multi-cavity mold.

In a first advantageous implementation of the invention, said head and said insert are molded and assembled in a common molding and assembly unit having respective multi-cavity molds for each of said parts, said method comprising the following steps:

a) closing the molding and assembly unit to mold simultaneously a plurality of said heads and said inserts in the multi-cavity molds of the molding and assembly unit;

b) opening the molding and assembly unit, with each portion of the molding and assembly unit supporting one of the kinds of part that are to be assembled together;

c) moving the cavities to bring the molded parts face to face in a central assembly zone of the molding and assembly unit, with the same cavity in the first multi-cavity mold always being brought to face the same cavity in the second multi-cavity mold;

d) closing the molding and assembly unit to assembly together the molded parts in the assembly zone;

e) opening the molding and assembly unit again in order to recover the assembled devices; and f) repeating steps a) to e) above.

Advantageously, simultaneously with step d), the molding and assembly unit is adapted to mold new head and insert parts in the multi-cavity molds of the molding and assembly unit.

Advantageously, step c) is implemented by turning at least one of the two plates, comprising a core plate supporting the cavities for molding the head, and a cavity plate supporting the cavities for molding the insert.

In a second implementation of the invention, each part molded in a cavity of said multi-cavity molds is identified after molding and stored separately from the parts molded in the other cavities prior to assembly.

Other characteristics and advantages of the present invention appear more clearly from the following detailed description made with reference to the accompanying drawings, given as non-limiting examples, and in which.

The invention relates to devices that include a spray head, provided with a spray orifice and having an insert disposed in the head upstream from said orifice. Advantageously, the insert and the head together define an expulsion channel and a spray profile, and they determine spraying performance and characteristics, such as, for example, the shape, the flow rate, and/or the power of the spray.

Figure 1:
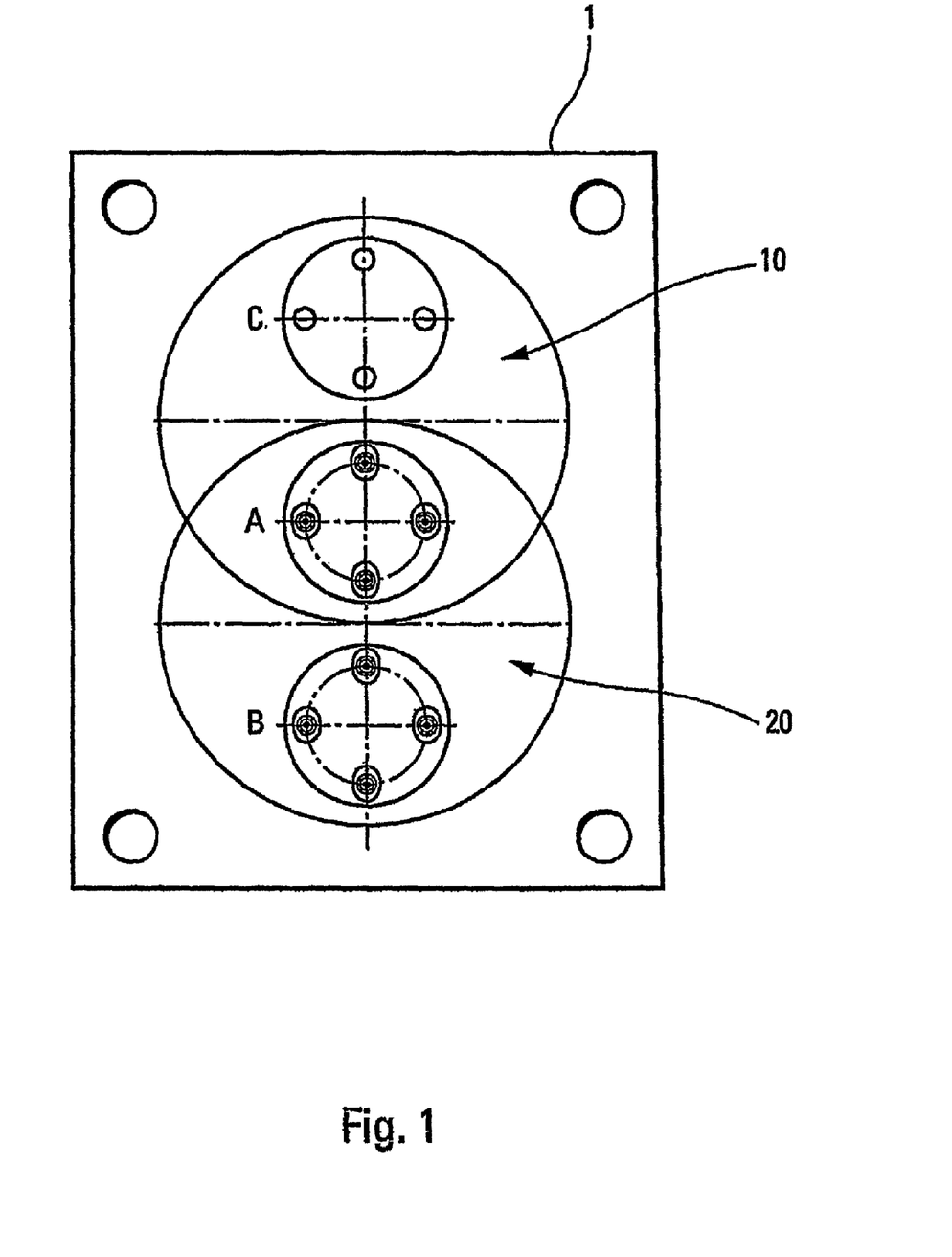
FIG. 1 is a diagrammatic section view from above of a molding and assembly unit in a first embodiment of the present invention.
Figure 2:
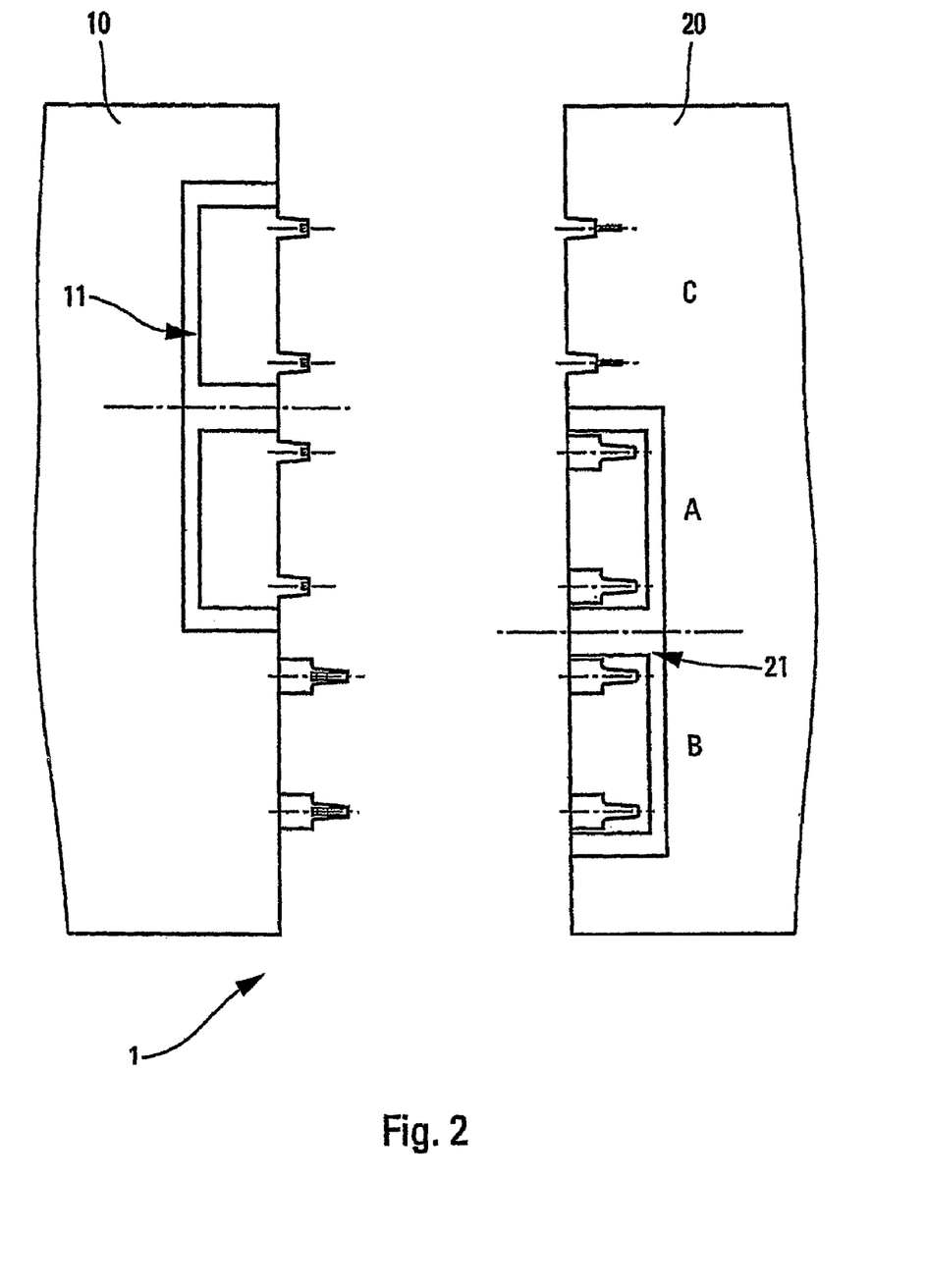
FIGS. 2 to 7 are diagrammatic section views showing the successive steps of the molding and assembly method in a first implementation of the present invention.

FIGS. 1 to 7 show a system and a method for molding and assembling a fluid spray device in a first embodiment of the present invention. In this first embodiment, the molding and assembly are performed in succession in a common molding and assembly unit 1. The molding and assembly unit 1 advantageously comprises a first mold portion 10 and a second mold portion 20 which can be moved in translation towards each other to close and open the molding and assembly unit. As can be seen in FIG. 2, the first mold portion 10 can define part of a first multi-cavity mold B and have a core plate 11 defining part of a second multi-cavity mold C, said core plate 11 possibly being mounted to turn about the axis along which the molding and assembly unit moves in translation. Similarly, the second mold portion 20 preferably defines the second multi-cavity mold C and includes a cavity plate 21 defining part of the first multi-cavity mold B, said cavity plate 21 possibly also being mounted to turn about the axis along which the molding and assembly unit moves in translation. Furthermore, as can be seen in FIG. 2, the core plate 11 is preferably offset perpendicularly from the translation axis relative to the cavity plate 21, such that the two plates 11 and 21 are situated so as to be partially overlapping in the molding and assembly unit 1 in order to define an assembly zone A, and are also partially offset away from each other to define the two multi-cavity molds B and C.

FIG. 1 is a diagram showing the multi-cavity molds each having two sets of four cavities, but it should be understood that an arbitrary number of cavities could be provided in each mold. In accordance with the invention, assembly is always performed so that the two different parts 100 and 200 that have been molded separately, i.e. the head and the insert, are assembled together in pairs so that each cavity in the first multi-cavity mold delivers a part that is always assembled with a part delivered by the same corresponding cavity in the second multi-cavity mold. This makes it possible to predetermine the properties and the performance of the assembled device for each pair of cavities, since the two parts constituting the assembled device always come from the same pair of cavities in their respective molds. Similarly, the angular orientation of the first part 100 relative to the second part 200 is always the same.

Figure 3:
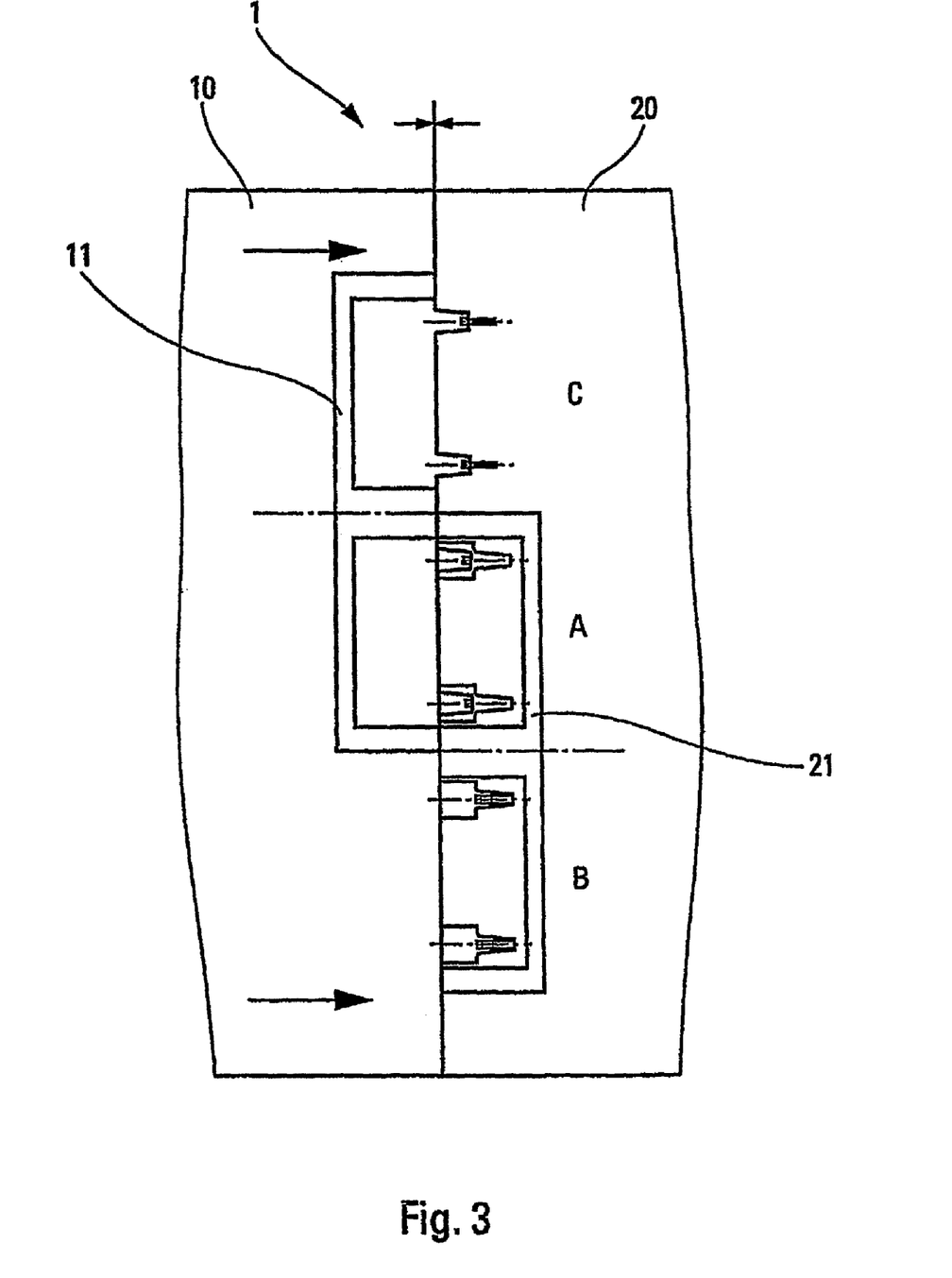
Figure 4:
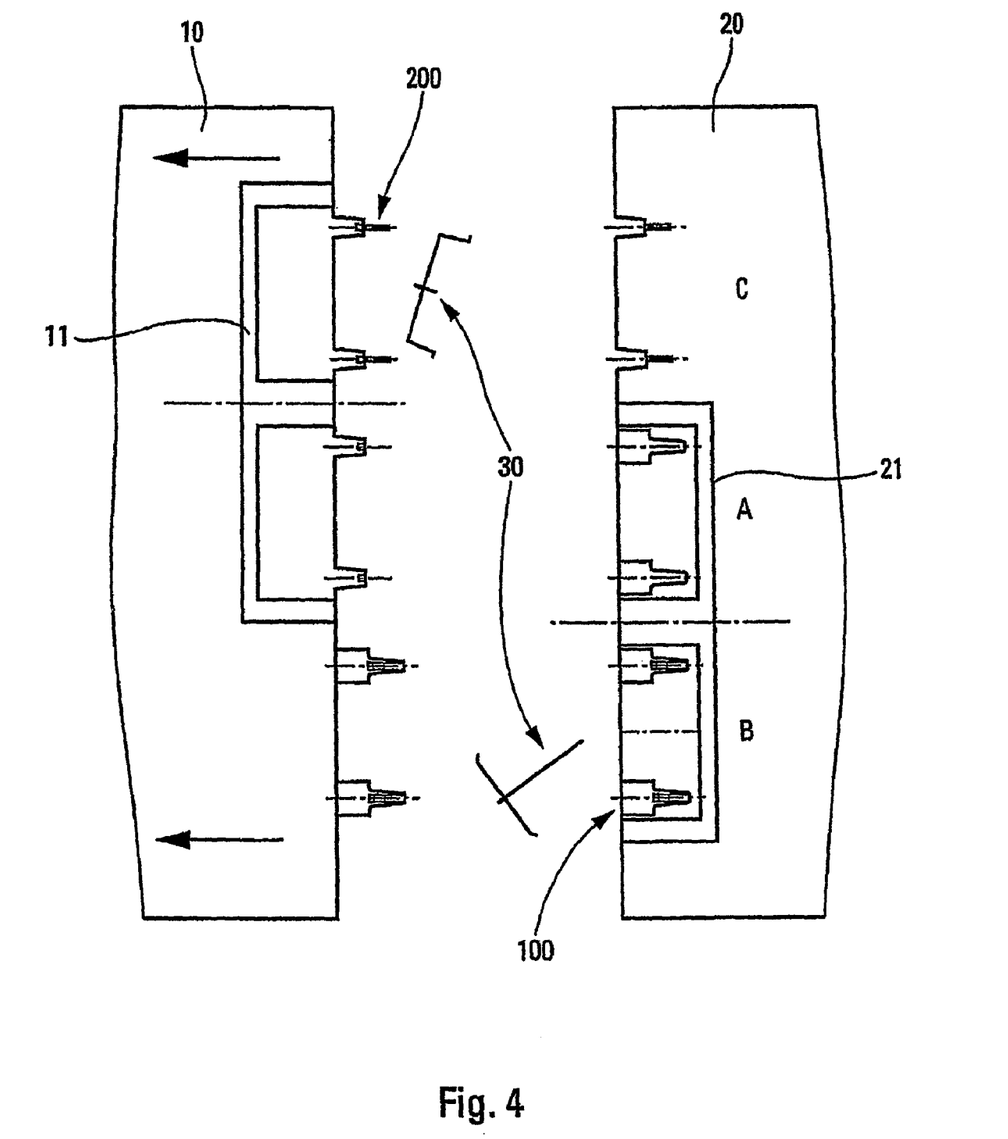
Figure 5:
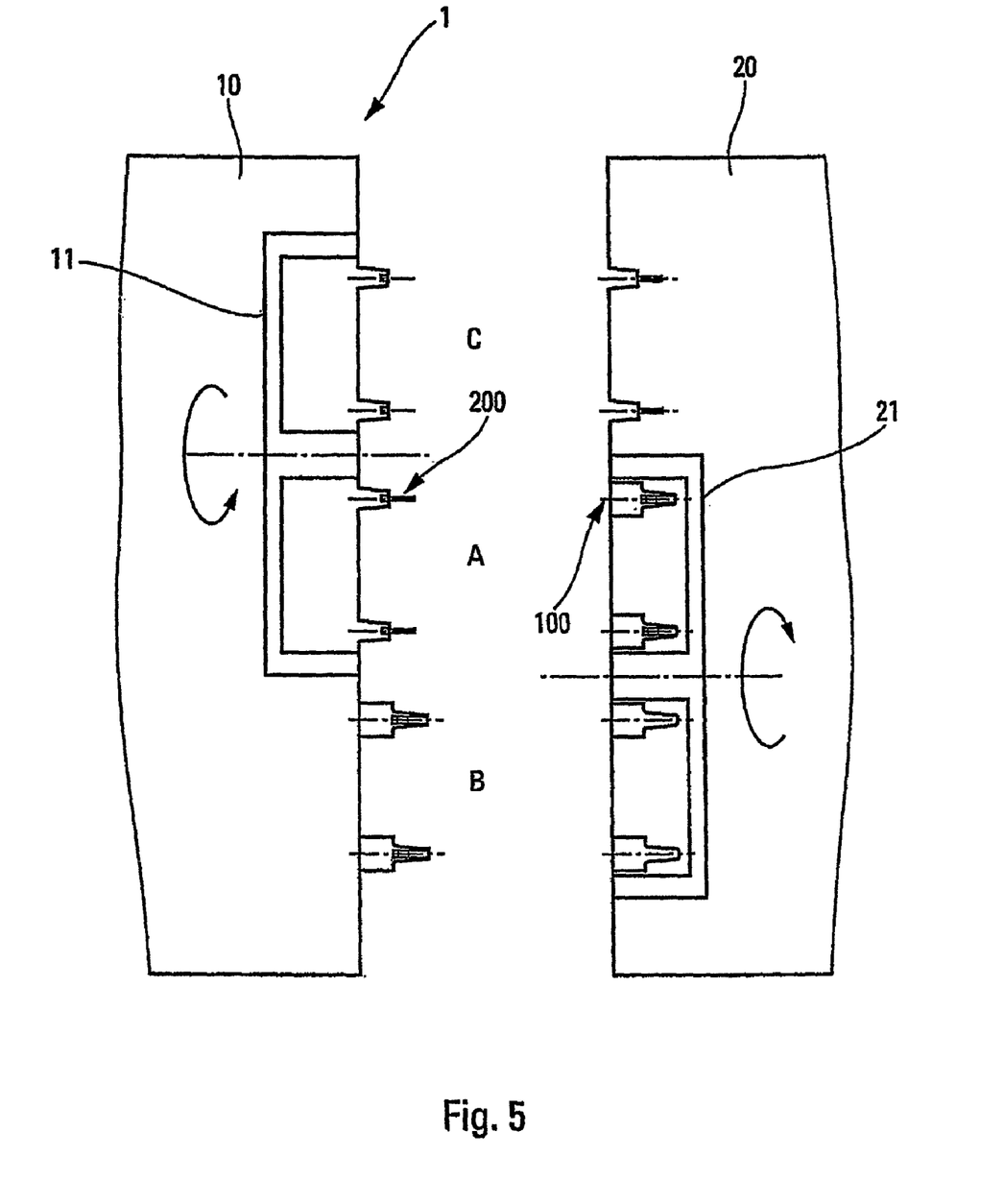
Figure 6:
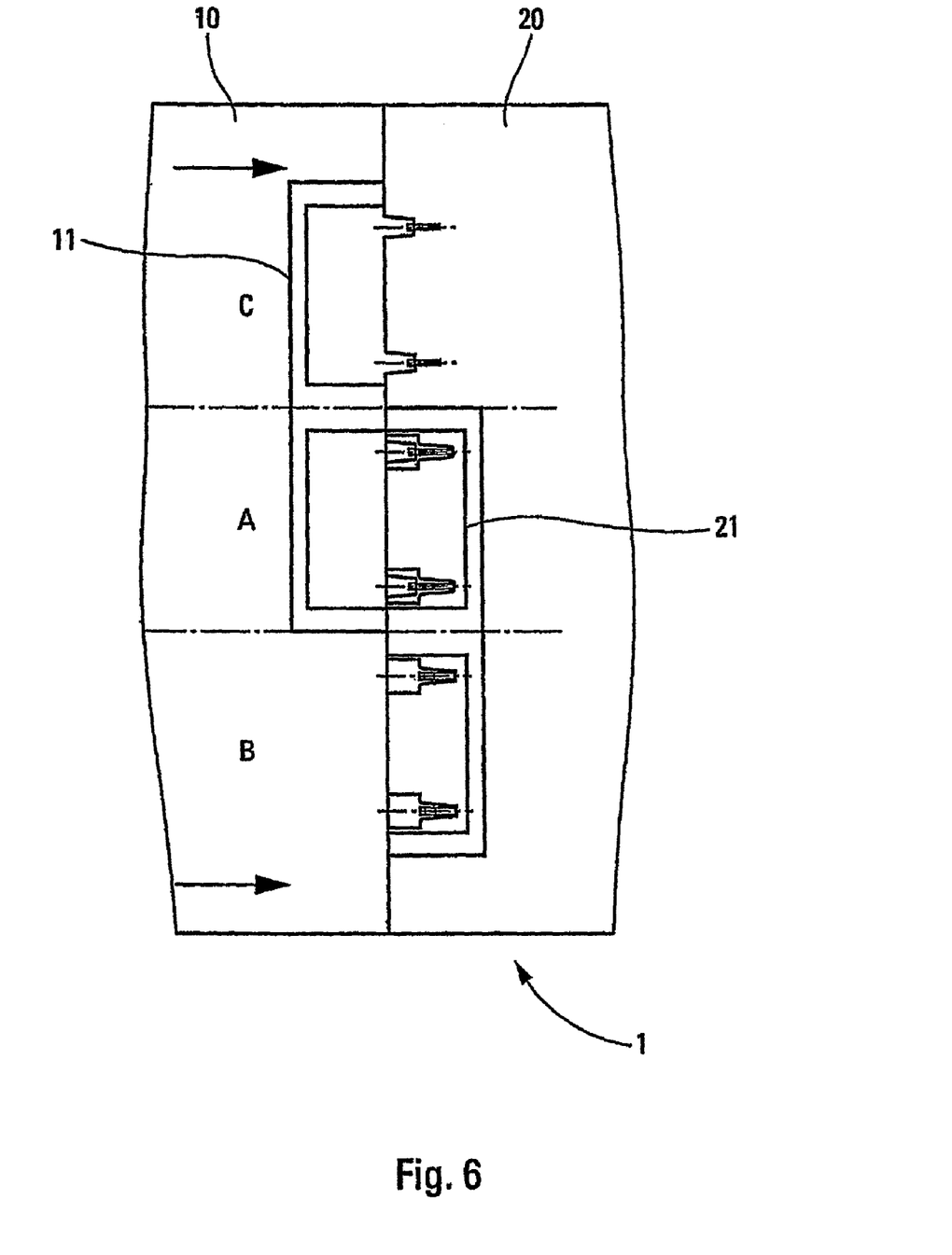
Figure 7:
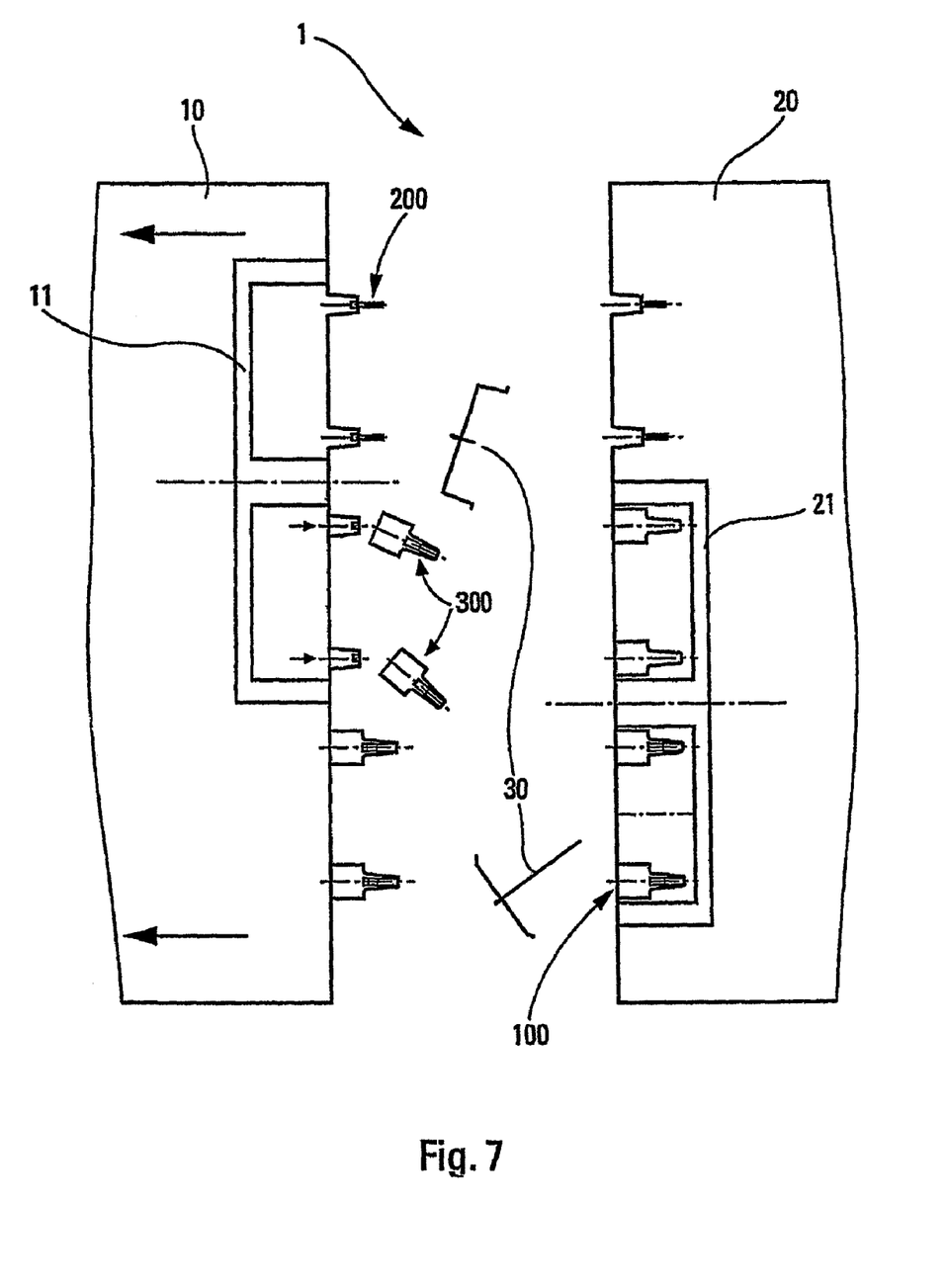

FIGS. 2 to 7 are described below to explain the molding and assembly method in an advantageous implementation of the invention. With reference initially to FIGS. 2 and 3, the molding and assembly unit 1 is initially closed and the two different parts 100, 200 of the dispenser device to be assembled (specifically an internal nozzle 200 in the form of a rod or an insert, and a nasal spray head 100 in which said nozzle 200 is to be inserted) are injection-molded in the molds B and C of the molding and assembly unit. As can be seen in FIG. 4, the molding and assembly unit is left open so as to move the core portion 10 away from the cavity portion 20, and eliminate the waste 30 (also referred to as "sprue"). The first molded part 100 (the dispenser head) remains secured to the second mold portion 20 of the molding and assembly unit, while the second molded part 200 (the internal nozzle) remains secured to the first mold portion 10 of said molding and assembly unit 1. The opposite configuration could also be envisaged. The core plate 11 and the cavity plate 21 are then turned about the translation axis of the molding and assembly unit 1 so as to bring at least one molded head 100 into register with at least one molded insert 200 in the assembly zone A, as shown in FIG. 5. In accordance with the invention, the core and cavity plates form parts of the multi-cavity molds so that a plurality of cavities for the molded head 100 are brought into the assembly zone A, and similarly a plurality of cavities for the molded insert 200 are brought into the assembly zone. The invention then guarantees that on each utilization cycle of the molding and assembly unit, each respective cavity of the core plate 11 is always situated facing the same corresponding cavity in the cavity plate 21, when in the assembly zone A. Similarly, the angular orientation of each of said cavities is always the same. Thereafter the molding and assembly unit 1 is reclosed, as shown in FIG. 6, thereby assembling the molded parts in the assembly zone A. This assembly may be implemented in particular by means of the system for ejecting parts from the molding and assembly unit, thus ensuring that assembly is performed safely and reliably, assembly actually taking place by the insert being ejected into the head. This assembly solution also presents the advantage of taking place without effort in that it is the shrinkage (reduction of the volume of the plastics material) that ensures that one part is clamped to the other without it being necessary to overcome dimensional interference as is the case in the conventional assembly method. Advantageously, new parts 100 and 200 can be molded simultaneously in the molds B and C of the molding and assembly unit 1. Under such circumstances, when the molding and assembly unit 1 is opened again, as shown in FIG. 7, the heads 100 are again held to the cavity plate 21 and the inserts 200 are held to the core plate 11. The assembled devices 300 are evacuated from the assembly zone A. Then in the same manner as described with reference to FIG. 4, any waste or sprue 30 produced during the molding process is likewise eliminated. Thereafter, by repeating the above-described steps, a molding and assembly unit is obtained that enables pairs of parts to be molded and assembled together, namely spray heads with respective internal nozzles.

In this first embodiment, molding and assembly thus takes place simultaneously in the same molding and assembly unit, thereby saving time, space, and money, and thus improving effectiveness. Furthermore, the parts for assembly are positioned very accurately, thereby eliminating any possible problems during assembly.

As mentioned above, the capacities of the core and cavity plates 11 and 21, forming the multi-cavity molds, may be optimized, e.g. by providing eight, twelve, or even more cavities in each plate, or indeed several sets of cavities, e.g. four, which would require a turn through 90° only on each cycle, unlike the embodiment described with reference to FIGS. 1 to 7, in which the core and cavity plates 11 and 21 need to be turned through 180° in order to perform the method of the invention.

As explained above, molding and assembly can be performed successively or simultaneously, providing the molding and assembly unit is adapted to this type of operation. Similarly, a single portion of the mold could be mounted to turn in order to perform selectively first molding and then assembly, or else both portions of the mold may include rotary portions, as shown in the drawings. Under such circumstances, cycle time is saved, but the molding and assembly unit is more complex since it has two rotary parts.

Naturally, the parts that are to be assembled together are not necessarily those described above by way of example, namely an internal nozzle and a nasal spray head, but could be constituted by any internal part for assembling inside any spray head (nasal, oral, or other).

Figure 8:
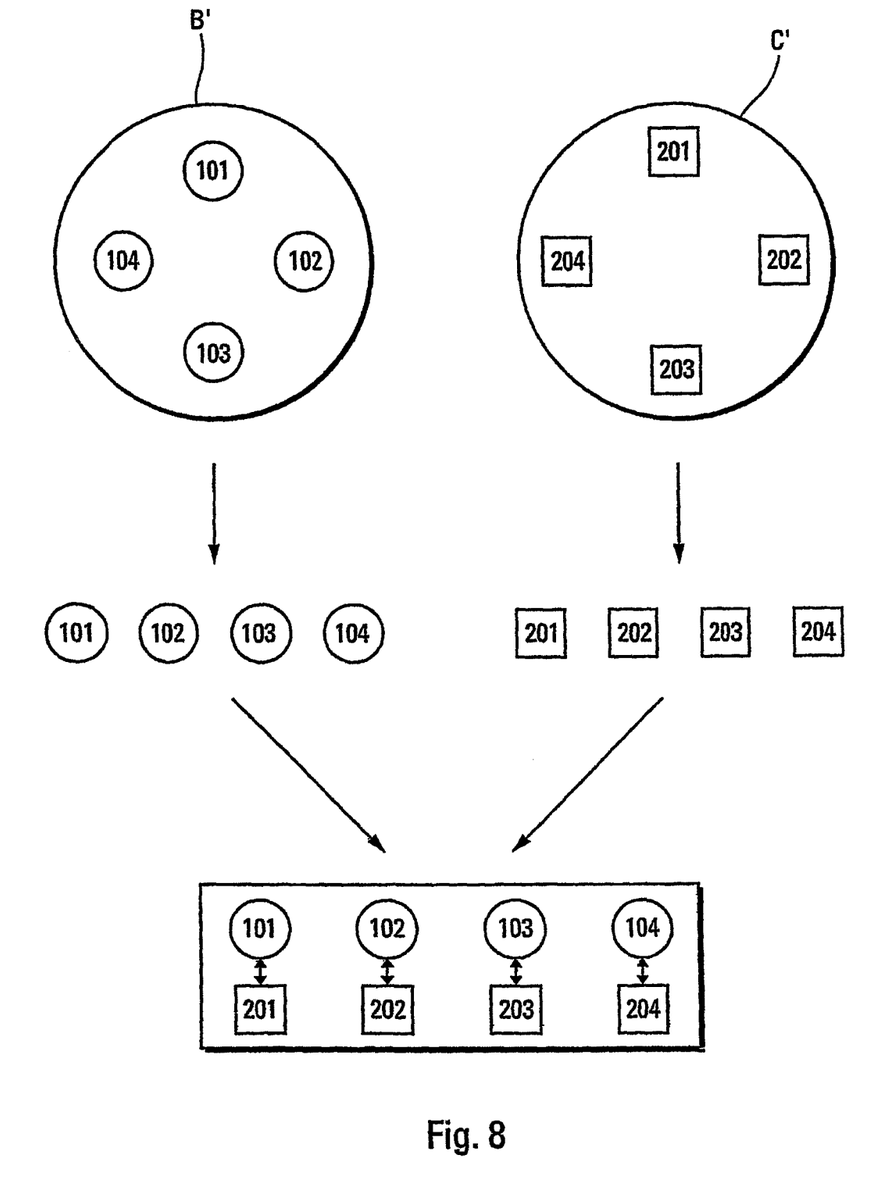
FIG. 8 is a diagram showing a system and a method for molding and assembly in a second implementation of the present invention.

FIG. 8 is a highly diagrammatic view of a second embodiment of the system and the method for molding and assembly in accordance with the present invention. In this second embodiment, molding and assembly are not performed in the same unit, but instead they are performed separately. Molding is initially performed suitable molds, and then the various molded parts are united in an assembly mold for assembly purposes. In accordance with the invention, the system comprises at least two multi-cavity molds B' and C' each designed to mold a respective part of the device. In the example shown, the molds are shown diagrammatically as having four cavities each, however it is clear that an arbitrary number of cavities could be provided in said molds. Each molded part obtained from the respective molds B' and C' can be stored separately after the molding step, so that the various parts can be fed in predetermined manner to the assembly unit 50, which serves, during the assembly process, always to assemble together parts coming from the same corresponding pairs of cavities in the respective multi-cavity molds. Thus, in the example shown diagrammatically in FIG. 8, said cavities in each of the multi-cavity molds are numbered, and a part from cavity x of the first mold B' is always assembled with a part from cavity x of the second mold C', thereby guaranteeing that the assembled devices present constant and predetermined properties and performance, in particular in terms of spraying. In order to identify the various parts after molding, they need to be stored separately, and it is possible in a variant to envisage marking each of the parts and then to detect the marking prior to assembly in order to predetermine which parts are assembled together.

Advantageously, the cavities in at least one of said multi-cavity molds B', C' include orientation-defining means, e.g. detectable marks for guaranteeing that when said first and second parts are assembled together they always have the same relative angular orientation. Preferably, the cavities in both molds B' and C' have such orientation-defining means.

As before, the parts for assembly are advantageously parts of a fluid spray device such as a nasal dispenser head 101, 102, 103, and 104 and an internal nozzle 201, 202, 203, and 204. Naturally, other, similar parts could be molded and assembled together using the same method of the invention.

The present invention thus makes it possible to optimize molding and assembly of a fluid spray device, and ensures that the characteristics and performance of the assembled devices are predetermined, in particular concerning spraying, independently of the number of cavities in each mold, and independently of the manufacturing tolerances that continue to exist in such multi-cavity molds.

The invention is described above with reference to two particular embodiments thereof, however it is clear that various modifications could be applied thereto by the person skilled in the art without going beyond the ambit of the present invention as defined by the accompanying claims.

The invention claimed is:

1. A method of molding and assembling a fluid spray device comprising two different parts, the first part being a spray head and the second part being an insert for assembling in said head, the method comprising:
   molding said head and said insert in respective first and second multi-cavity molds; and
   assembling each part coming from a particular cavity of the first multi-cavity mold always with a part coming from the same respective cavity of the second multi-cavity mold;
   wherein said head and said insert are molded and assembled in a common molding and assembly unit having the respective multi-cavity molds for each of said parts, said method further comprising:
   a) closing the molding and assembly unit to mold simultaneously a plurality of said heads and said inserts in the multi-cavity molds of the molding and assembly unit;
   b) opening the molding and assembly unit, with each portion of the molding and assembly unit supporting one of the kinds of part that are to be assembled together;
   c) moving the cavities to bring the molded parts face to face in a central assembly zone of the molding and assembly unit, with the same cavity in the first multi-cavity mold always being brought to face the same cavity in the second multi-cavity mold;
   d) closing the molding and assembly unit to assembly together the molded parts in the assembly zone;
   e) opening the molding and assembly unit (1) again in order to recover the assembled devices; and
   f) repeating steps a) to e) above.

2. The method according to claim 1, in which, simultaneously with step d), the molding and assembly unit is adapted to mold new head and insert parts in the multi-cavity molds of the molding and assembly unit.

3. The method according to claim 1, in which said step c) is implemented by turning at least one of the two plates, comprising a core plate supporting the cavities for molding the head, and a cavity plate supporting the cavities for molding the insert.

4. The method according to claim 1, in which each part molded in a cavity of said multi-cavity molds is identified after molding and stored separately from the parts molded in the other cavities prior to assembly.

* * * * *